US008814512B2

(12) United States Patent
Skaustein et al.

(10) Patent No.: US 8,814,512 B2
(45) Date of Patent: Aug. 26, 2014

(54) FAN DISK APPARATUS AND METHOD

(75) Inventors: Torgrim Skaustein, Stavanger (NO); Jorgen Albriktsen, Sola (NO)

(73) Assignee: United Technologies Corporation, Hartford, CT (US)

( * ) Notice: Subject to any disclaimer, the term of this patent is extended or adjusted under 35 U.S.C. 154(b) by 708 days.

(21) Appl. No.: 13/176,521

(22) Filed: Jul. 5, 2011

(65) Prior Publication Data

US 2013/0011241 A1    Jan. 10, 2013

(51) Int. Cl.
*B23F 19/04* (2006.01)
*F01D 25/28* (2006.01)
*F02K 3/06* (2006.01)
*F02C 7/36* (2006.01)
*F01D 25/24* (2006.01)

(52) U.S. Cl.
CPC ............. *F02C 7/36* (2013.01); *F01D 25/285* (2013.01); *F02K 3/06* (2013.01); *Y02T 50/671* (2013.01)
USPC .............. 415/213.1; 415/126; 29/402.01; 29/426.1; 29/889.1

(58) Field of Classification Search
CPC .............. F01D 25/285; F05D 2230/60; F05D 2230/64; F05D 2230/644; F05D 2230/68; F05D 2230/70; F05D 2230/72; F05D 2230/80
USPC ............. 415/126, 213.1, 232; 416/61, 146 R, 416/244 A, 248; 29/402.01, 426.1, 889.1
See application file for complete search history.

(56) References Cited

U.S. PATENT DOCUMENTS

| 3,216,654 | A | | 11/1965 | Kappus |
| 4,433,830 | A | * | 2/1984 | Campbell ............ 254/264 |
| 4,566,269 | A | | 1/1986 | Gingras |
| 4,734,007 | A | | 3/1988 | Perry |
| 4,744,214 | A | | 5/1988 | Monsarrat et al. |
| 4,825,648 | A | | 5/1989 | Adamson |
| 5,205,513 | A | | 4/1993 | Schilling |
| 7,568,575 | B2 | * | 8/2009 | Kalantari ............ 198/687 |
| 2008/0206056 | A1 | | 8/2008 | Suciu et al. |
| 2009/0288291 | A1 | * | 11/2009 | Ziekow et al. ......... 29/700 |

FOREIGN PATENT DOCUMENTS

| EP | 0298014 A1 | 4/1989 |
| EP | 0516388 A2 | 2/1992 |
| EP | 2075439 A2 | 1/2009 |
| GB | 2219046 A | 11/1989 |
| GB | 2238082 A | 5/1991 |

* cited by examiner

*Primary Examiner* — Edward Look
*Assistant Examiner* — Jason Davis
(74) *Attorney, Agent, or Firm* — Kinney & Lange, P.A.

(57) ABSTRACT

An apparatus for a gas turbine engine comprises a spool lock for locking a compressor spool and a lift for removing a rotor from the compressor spool. The spool lock comprises an outer ring configured for attachment to a compressor case of the gas turbine engine, an inner ring configured to support a compressor spool within the compressor case, and a web extending between the outer ring and the inner ring. The lift comprises a beam configured for attachment to a flange of the gas turbine engine, a support strut configured to support the beam above the compressor spool, and a hoist configured to support the rotor for removal from the compressor spool.

20 Claims, 7 Drawing Sheets

FAN DISK APPARATUS AND METHOD

BACKGROUND

This invention relates generally to gas turbine engines, and specifically to turbofan engines for aircraft. In particular, the invention concerns a repair or maintenance apparatus for the fan disk and rotor assembly of a turbofan engine.

Gas turbine engines (or combustion turbines) are built around a power core made up of a compressor, combustor and turbine, arranged in flow series with an upstream inlet and downstream exhaust. The compressor compresses air from the inlet, which is mixed which fuel in the combustor and ignited to generate hot combustion gas. The turbine extracts energy from the expanding combustion gas, and drives the compressor via a common shaft. Energy is delivered in the form of rotational energy in the shaft or reactive thrust from the exhaust, or both.

Gas turbine engines provide reliable, efficient sources of energy for a wide range of applications, including industrial power generation, aviation and commercial heating and cooling. Larger-scale gas turbine engines include a number of different compressor and turbine sections, which are arranged into coaxially nested spools. The spools operate at different pressures and temperatures, and rotate at different speeds. Individual compressor and turbine sections are subdivided into a number of stages, which are formed of alternating rows of rotor blade and stator vane airfoils. The airfoils are shaped to turn, accelerate and compress the gas flow, and to generate lift for conversion to rotational energy in the turbine.

Aviation applications include turbojet, turbofan, turboprop and turboshaft engine designs. Turbojets are an older configuration, in which thrust is generated primarily from the exhaust. Modern turbofan and turboprop engines typically utilize a two-or three-spool arrangements, in which the low-pressure spool is coupled to a propulsion fan or propeller. Turboshaft engines are used on rotary-wing aircraft, including helicopters.

Turbofans are commonly divided into high and low bypass engines. High-bypass turbofans generate most of their thrust via the fan, which drives airflow through a bypass duct oriented around the engine core. Low-bypass turbofans generate more power from the exhaust flow, delivering greater specific thrust but at some cost in noise and fuel efficiency, and are used on supersonic fighters and other high-performance aircraft.

In general, commercial aircraft trend toward higher bypass turbofan designs, in order to increase fuel efficiency at cruise. The corresponding fan disk and rotor assemblies are relatively large, requiring specialized equipment for maintenance and repair.

SUMMARY

This invention is directed to a maintenance apparatus for a gas turbine engine. The apparatus includes a spool lock configured to lock the compressor spool, and a lift configured to support a compressor or fan rotor during installation and removal.

The spool lock includes an outer ring configured for attachment to the compressor case, an inner ring configured to support the compressor spool within the compressor case, and a web extending between the inner and outer rings. The lift includes a beam and a support strut configured for attachment to the flange of the gas turbine engine. The support strut is pivotally attached to the beam, so that the beam can be oriented with respect to the rotational axis. The beam includes an axially translating hoist, which is used to support the rotor during installation and removal from the compressor spool.

DETAILED DESCRIPTION

Figure 1:
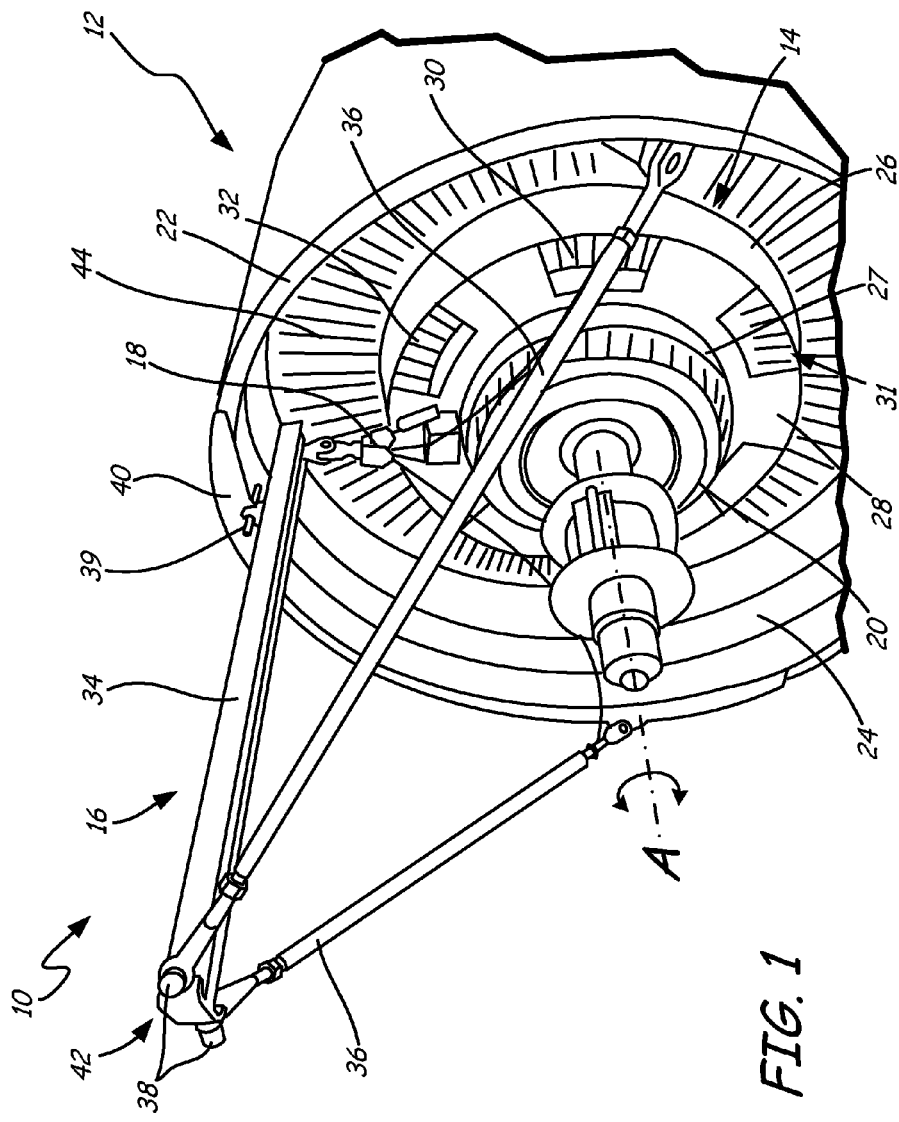
FIG. 1 is a perspective view of a fan disk maintenance apparatus for a gas turbine engine.

FIG. 1 is a perspective view of fan disk maintenance apparatus 10 for gas turbine engine 12. Maintenance apparatus 10 includes spool lock 14 and lift 16 with hoist 18 for installation and removal of fan disk (or rotor) 20.

FIG. 1 shows gas turbine (or turbofan) engine 12 with the nacelle removed, exposing annular front flange 22 on the front (axially forward) end of fan casing 24. Lift 16 attaches to flange 22, so that the weight of rotor 20 is supported from gas turbine engine 12 during installation and removal. Maintenance apparatus 10 provides for "on wing" maintenance operations on fan disks and other compressor, fan or turbine rotors 20, without removing gas turbine engine 12 from the aircraft, and without requiring a crane, external lift rig or other heavy equipment.

Spool lock 14 is formed of strong, durable metal or metal alloy such as stainless steel or aluminum, and includes outer ring 26, inner ring 27 and web 28. Outer ring 26 is coupled to a stationary component of the compressor or fan casing, for example a booster flange, or an inner or outer diameter guide vane ring.

Inner ring 27 of spool lock 14 locks compressor spool assembly 30 against rotation, and provides axial and radial support during installation and removal of rotor 20. Web 28 supports inner ring 27 from outer ring 26, with openings 31 to reduce weight and provide access to compressor blades 32, or other internal components of spool assembly 30.

Lift 16 includes hoist beam 34 for supporting hoist 18, and adjustable struts 36 for supporting beam 34. First end 39 of beam 34 is attached to front flange 22 (or another flange structure) of gas turbine engine 12, using flush attachment member 40. Struts 36 are pivotally attached to second end 42 of beam 34, using hoist pivots 38.

Struts 36 also attach to flange 22 of gas turbine engine 12, or another stationary component of fan casing 24, or another casing structure. Struts 36 have adjustable length, in order to position beam 34 in a level, horizontal orientation above spool assembly 30, and along rotational axis A of gas turbine engine 12. Beam 34 is positioned above and generally parallel to rotational axis A, as shown in FIG. 1.

In the configuration of FIG. 1, gas turbine engine 12 includes a booster module (spool assembly 30) with a one-stage fan disk (or fan rotor) 20, and a low-pressure or "booster" compressor with one or more stages of compressor blades 32. Fan exit guide vanes (or other stators vanes) 44 are arranged downstream of rotor 20, extending radially from an inner diameter (ID) ring positioned about booster spool assembly 30, to an outer diameter (OD) ring at casing 24.

In other configurations, spool assembly 30 includes a low-pressure, intermediate-pressure or high-pressure compressor spool, or a fan spool or a fan shaft assembly, with or without additional compressor stages. In advanced turbofan engines, a geared drive mechanism is used to couple spool assembly 30 to rotor 20, providing independent fan speed control for reduced noise and increased efficiency. The number of fan stages also varies, with a corresponding number of axially spaced fan disks 20, in either co-rotating or counter-rotating configurations.

Figure 2:
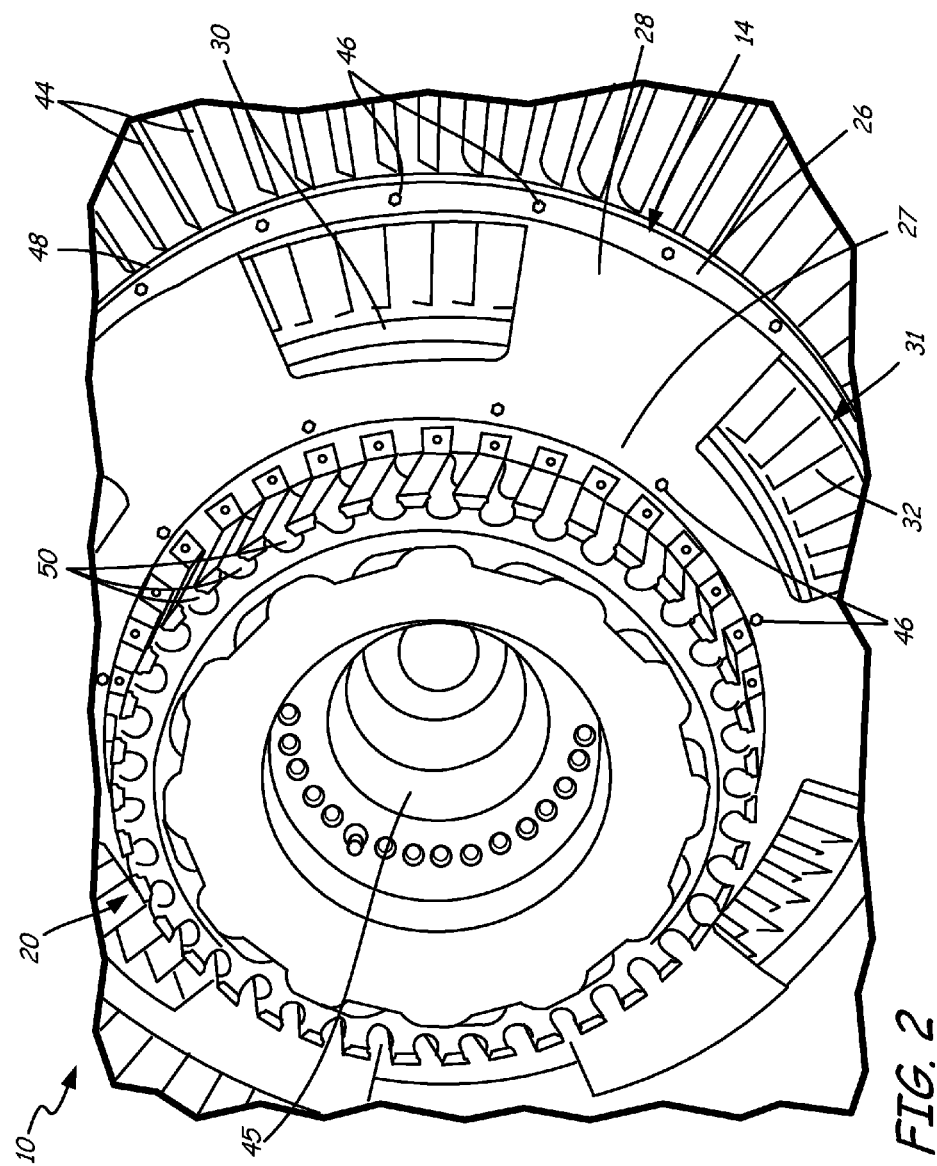
FIG. 2 is a detail of a spool lock for the fan disk maintenance apparatus.

FIG. 2 is a detail of spool lock 14 for maintenance apparatus 10 of FIG. 1. Spool lock 14 includes outer ring 26, inner ring 27 and web 28 for supporting spool assembly 30 during installation and removal of rotor 20, as described above.

Rotor 20 includes dovetail slots 50, which are used to attach radially-extending fan blades for rotation about fan or compressor shaft 45. Rotor 20 is removed from spool assembly 30 by releasing the mechanical attachments (e.g., bolts) connecting rotor 20 to shaft 45, and translating rotor 20 axially forward, away from rotor blades 32 and the other components of spool assembly 30.

As shown in FIG. 2, outer ring 26 of spool lock 14 is attached to a fixed component of compressor casing 48, for example using bolts 46 to attach outer ring 26 through the existing bolt holes in a booster flange. Alternatively, outer ring 26 of spool lock 14 is attached to a different (stationary) engine or compressor component, for example along the inner or outer diameter of vanes 44, or directly to casing 24.

Inner ring 27 of spool lock 14 locks spool assembly 30 against rotation using additional bolts 46, which are spaced to use existing bolt holes in the spool shaft, or with other mechanical fasteners. Inner ring 27 also provides axial and radial support to the rotational components of spool assembly 30, so that rotor blades 32 and shaft 45 do not come loose or come into contact with the stationary structures of gas turbine engine 12.

As shown in FIG. 2, web 28 is formed as a number of tabbed features (e.g., six) arranged circumferentially about spool lock 14, extending between outer ring 26 and inner ring 27. Openings 31 are interspersed between the tab features, providing an open-web design to reduce weight and allow for easier handing and access. Alternatively, openings 31 are omitted, or made smaller, and web 28 provides a substantially continuous conical or frustoconical support structure between outer ring 26 and inner ring 27 of spool lock 14.

In operation of the system shown in FIG. 2, the first-stage vane ring of spool assembly 30 is removed, and replaced with spool lock 14. Spool lock 14 is then attached to compressor casing 48 at outer ring 26, and to spool assembly 30 at inner ring 27. Spool lock 14 locks spool assembly 30 against rotation, and supports spool assembly 30 both radial and axially during installation and removal of rotor 20.

Figure 3:
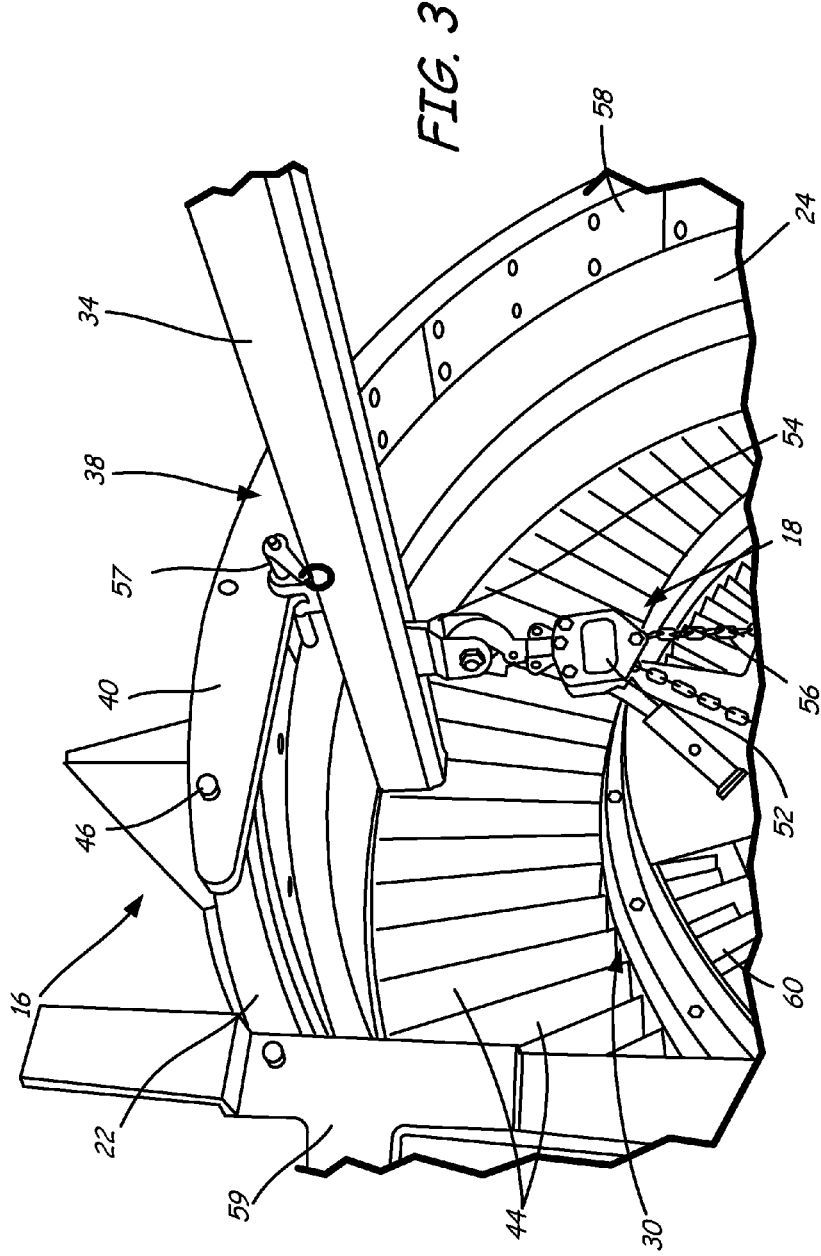
FIG. 3 is a detail of a hoist beam for the fan disk maintenance apparatus.

FIG. 3 is a detail of lift 16 and beam 34 for fan disk maintenance apparatus 10 of FIG. 1. Beam 34 supports hoist 18 with winch 52, slider 54 and chain 56. Slider 54 allows for axial translation of hoist 18 along beam 34.

First end 39 of beam 34 is attached to flange 22 of casing 24 via hoist attachment (or coupler) 40, for example using bolts 46 to make a flush connection between attachment 40 and flange 22. Beam 34 is then suspended from attachment 40 via pin mechanism 57.

In some designs, casing 24 includes acoustic treatment 58. In addition, fan shaft lock 59 can be connected across flange 22 and coupled to the fan disk to lock the fan shaft against rotation during maintenance. FIG. 3 also shows spool assembly 30 with first-stage compressor vanes 60 still in place, before the installation of spool lock 14, as shown in FIG. 2.

Figure 4:
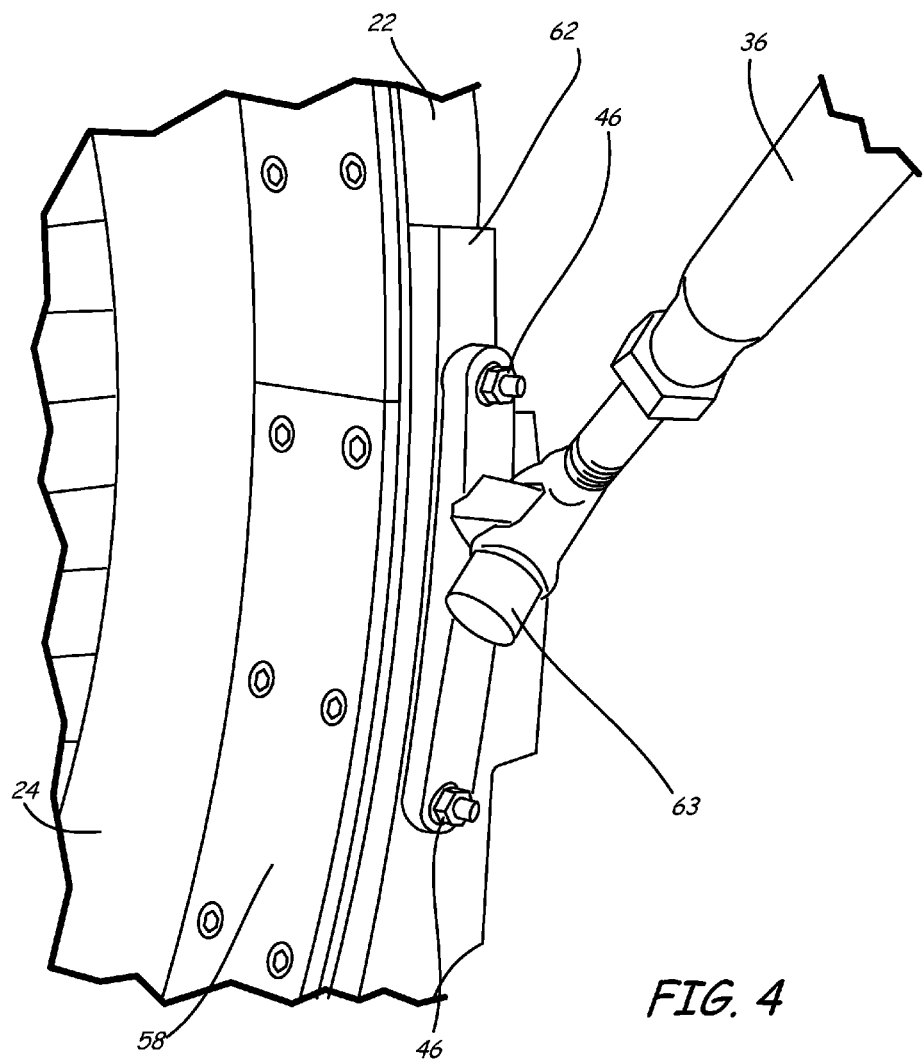
FIG. 4 is a detail of a support strut for the fan disk maintenance apparatus.

FIG. 4 is a detail of support strut 36 for fan disk maintenance apparatus 10 of FIG. 1. Support strut 36 is pivotally attached to casing 24 via strut coupler 62 and strut pivot 63. Strut coupler 62 is attached to casing 24, for example by flush mount attachment using bolts 46 through existing bolt holes in flange 22.

Pivot 63 provides for angular motion between strut 36 and casing 24, in order to position strut coupler 62 flush onto flange 22. Pivot 63 also provides for angular motion between strut 36 and flange 22, in order to position the beam parallel to the engine axis, as described above.

As shown in FIG. 4, holes for bolts 46 in strut coupler 62 are spaced to accommodate existing bolt holes in flange 22 (similarly for attachment 40 of FIG. 3). The existing bolt holes are not necessarily provided for use during maintenance, but are typically configured to attach other engine components to fan case 24, for example a forward fan case or nacelle. Alternatively, screws, clamps or other mechanical fastening devices are used in place of one or more bolts 46.

Figure 5:
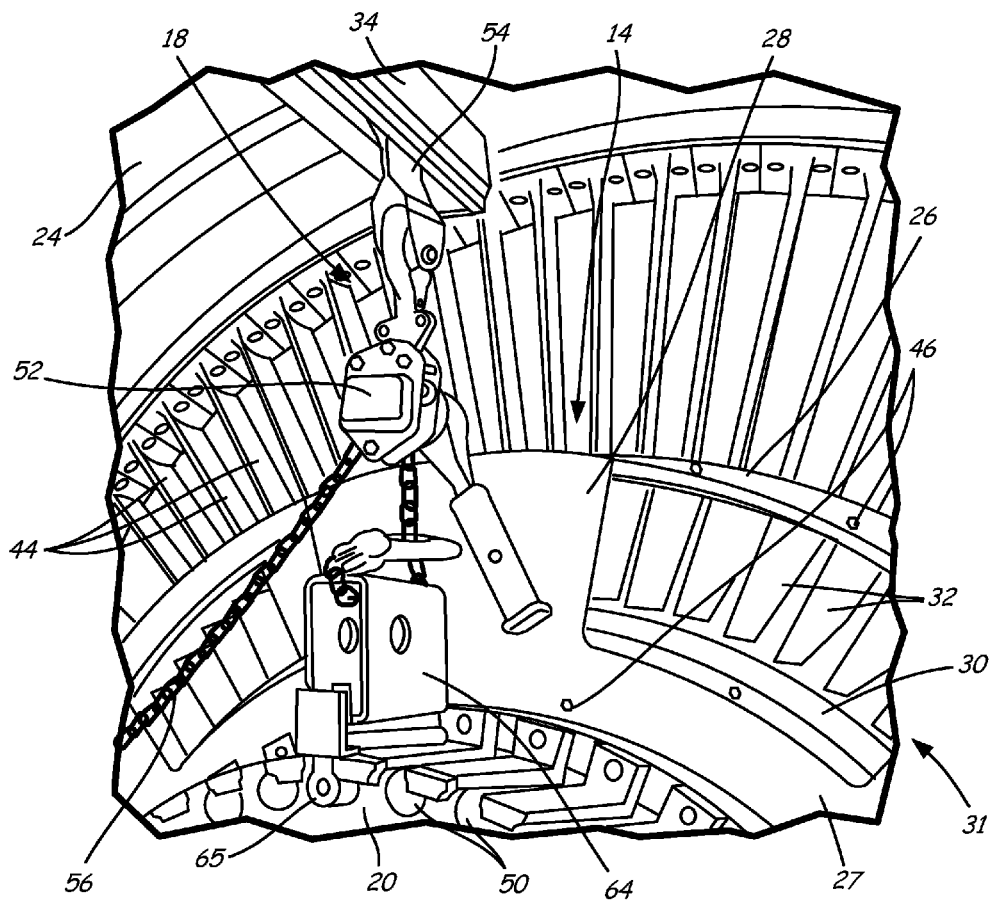
FIG. 5 is a detail of a hoist for the fan disk maintenance apparatus.

FIG. 5 is a detail of hoist 18 for fan disk maintenance apparatus 10 of FIG. 1. Hoist 18 includes winch 52, which is supported from beam 34 on slider 54. Chain 56 is connected to lift jig 64, which supports rotor 20.

Winch 52 comprises a ratchet or other tensioning mechanism attached to chain 56, or to a cable or rope. Slider 54 includes a roller bearing or sliding mechanism, allowing hoist 18 and winch 52 to translate axially along beam 34.

Chain 56 is attached to the rotor 20 using lift jig 64. Lift jig 64 includes dovetail member 65, which is shaped for insertion into one of slots 50 in rotor 20. Winch 52 is actuated to increase or decrease the tension in chain 56 and raise or lower rotor 20, and to support the weight of rotor 20 from beam 34 during installation and removal from spool assembly 30.

Figure 6:
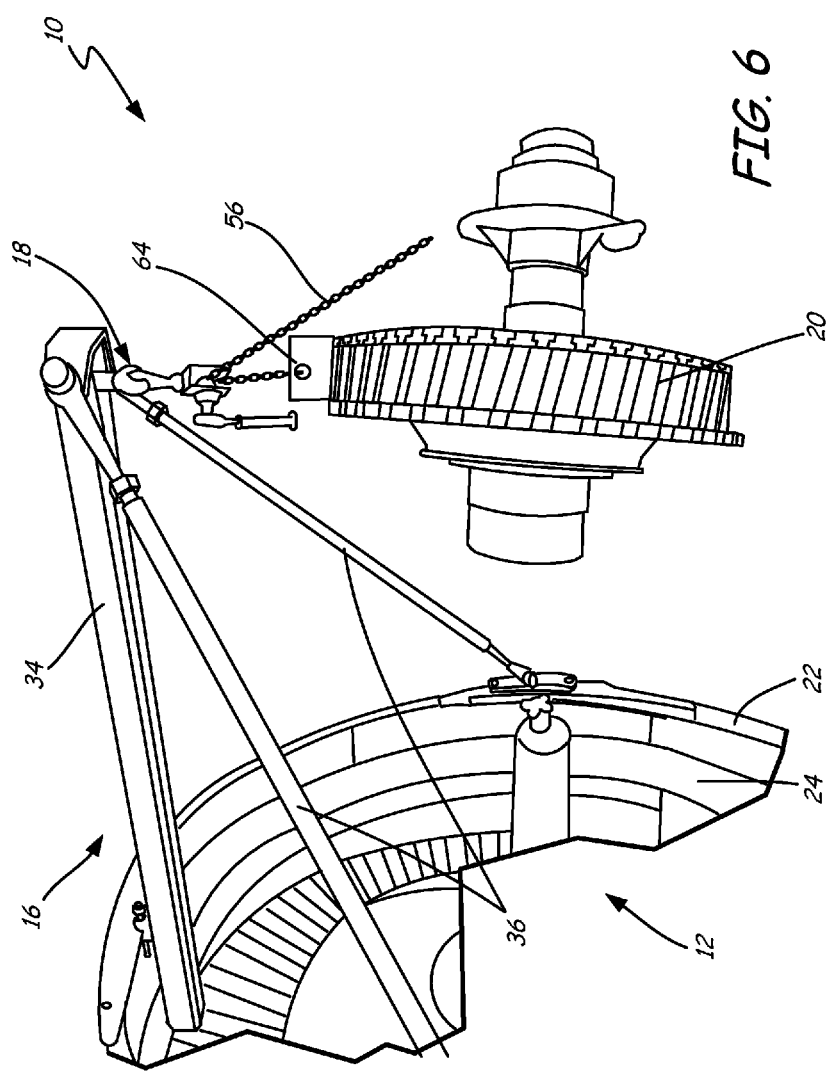
FIG. 6 is a side view of the fan disk maintenance apparatus, with the fan disk removed.

FIG. 6 is a side view of fan rotor maintenance apparatus 10, with rotor 20 supported from beam 34. Rotor 20 is attached to hoist 18 via lift jig 64 and chain 56. As hoist 18 translates along beam 34, rotor 20 translates axially in and out of casing 24, for installation and removal from gas turbine engine 12.

Rotor 20 is typically a lifetime limited part, which must be removed for maintenance or replacement after a finite number of engine hours, or a fixed number of takeoff and landing cycles. Depending on the design of gas turbine engine 12, the entire booster (low pressure compressor) and fan assembly must often be removed in order to access rotor 20, requiring a large hangar with a crane and heavy tooling fixtures. Because not all regional facilities have this equipment, gas turbine engine 12 must be removed from the aircraft and shipped to a centralized overhaul center for maintenance, repair and replacement of rotor 20.

With fan disk maintenance apparatus 10, only rotor 20 is removed. Gas turbine engine 12 remains on the aircraft, with the rest of the low-pressure spool and booster assembly. This reduces the number of person-hours required to remove and replace rotor 20 by a factor of approximately two. In addition, maintenance apparatus 10 supports fan rotor 20 directly from flange 22 of gas turbine engine 12, so there is no need for an external crane or other heavy lifting equipment. This allows maintenance apparatus 10 to be used "on wing," without removing gas turbine engine 12 from the aircraft, reducing downtime and increasing the utility and versatility of smaller-scale regional maintenance and repair facilities.

Figure 7:
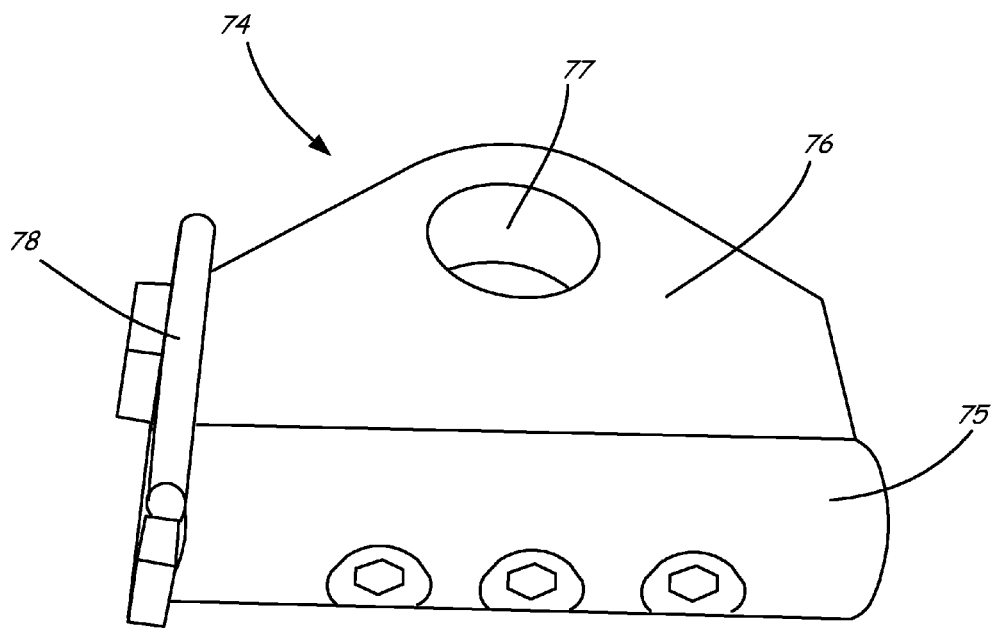
FIG. 7 is a detail of an alternate lift jig for the fan disk maintenance apparatus.

FIG. 7 is a detail view of alternate lift jig 74 for fan disk maintenance apparatus 10 of FIG. 1. In this configuration, lift jig 74 comprises dovetail member 75 attached to jig body 76 with jig attachment 77 and stop 78.

Dovetail member 75 is shaped to fit into a fan blade retention slot on a fan disk, as described above. Depending on configuration, dovetail member 75 has an oblong or dovetail cross section, or a round, square, triangular or other geometry, depending on the shape of the fan disk and blade retention slots.

Jig attachment 77 is formed as a hole or other structure in jig body 76 to attach a lift cable or chain, for example using a hook mechanism. Stop 78 is configured to limit axial movement of lift jig 74 when dovetail member 75 is positioned at a particular depth in the retention slot, so that the center of mass of the fan disk is approximately vertical with jig attachment 77, and the fan disk is vertically suspended from beam 34 during installation and removal.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. An apparatus for a gas turbine engine, the apparatus comprising:
   a spool lock for locking a compressor spool of the gas turbine engine, the spool lock comprising an outer ring configured for attachment to a compressor case of the gas turbine engine, an inner ring configured to support the compressor spool within the compressor case, and a web extending between the outer ring and the inner ring; and
   a lift for removing a rotor from the compressor spool, the lift comprising:
      a beam configured for attachment to a flange of the gas turbine engine;
      a support strut configured to attach to the flange to support the beam above the compressor spool; and
      a hoist configured to support the rotor for removal from the compressor spool.

2. The apparatus of claim 1, wherein the hoist comprises a lift jig configured to support the rotor from the beam by inserting the lift jig into a blade retention slot in the rotor.

3. The apparatus of claim 2, wherein the lift jig comprises a dovetail and a stop configured to axially position the lift jig with respect to the fan rotor when the dovetail is inserted into the blade retention slot.

4. The apparatus of claim 1, wherein the beam is suspended from a flush attachment member attached to the flange.

5. The apparatus of claim 4, wherein the support strut is pivotally attached to the beam.

6. The apparatus of claim 4, wherein the support strut is pivotally attached to a strut coupler configured for flush attachment to the flange.

7. The apparatus of claim 1, wherein the outer ring of the spool lock comprises bolt holes spaced to attach the spool lock to the compressor case using existing bolt holes in the compressor case.

8. The apparatus of claim 7, wherein the inner ring of the spool lock comprises bolt holes spaced to lock the compressor spool against rotation using existing bolt holes in the compressor spool.

9. A system comprising:
   a gas turbine engine, the gas turbine engine including:
      a spool assembly positioned within a compressor casing;
      a fan disk rotationally coupled to the spool assembly; and
      a casing coaxially disposed about the fan disk, the casing having a flange;
   a spool lock for locking the spool assembly to the compressor casing, the spool lock comprising an outer ring attached to the compressor casing, an inner ring attached to the spool assembly and a web connecting the outer ring to the inner ring; and
   a lift for supporting the fan disk, the lift comprising a beam and two support struts attached to the flange to support the beam above the spool assembly, the beam comprising a hoist configured to support the fan disk.

10. The system of claim 9, wherein the support struts are pivotally attached to the beam.

11. The system of claim 10, wherein the support struts support the beam substantially parallel to a rotational axis of the spool assembly.

12. The system of claim 9, wherein the spool assembly comprises a booster spool, the booster spool comprising a fan shaft and a compressor stage.

13. The system of claim 12, wherein the web comprises holes for reducing weight and for providing access to the compressor stage.

14. The system of claim 13, wherein the spool lock comprises bolt holes for bolting the outer ring to the compressor casing and for bolting the inner ring to the spool assembly.

15. The system of claim 9, wherein the hoist comprises a lift jig configured to support the fan disk by insertion into a blade retention slot.

16. A maintenance method for a gas turbine engine, the method comprising:
   attaching a lift to a flange of a gas turbine engine, the lift comprising a beam and a support strut pivotally attached to the beam;
   aligning the beam above the compressor spool by attaching the support strut to the flange;
   attaching a spool lock to the gas turbine engine, the spool lock comprising an outer ring, an inner ring and a web connecting the inner ring to the outer ring;
   locking a compressor spool of the gas turbine engine by connecting the inner ring to the compressor spool and the outer ring to a stationary casing; and
   supporting a fan disk from the beam.

17. The method of claim 16, further comprising removing the fan disk from the compressor spool.

18. The method of claim 17, further comprising translating the fan disk axially along the beam.

19. The method of claim 18, further comprising installing the fan disk onto the compressor spool.

20. The method of claim 16, wherein aligning the beam above the compressor spool comprises pivotally attaching the support strut to the flange.

* * * * *